INVENTORS
THEODORE M. HARRER
MALCOLM W. LOVELAND
BY

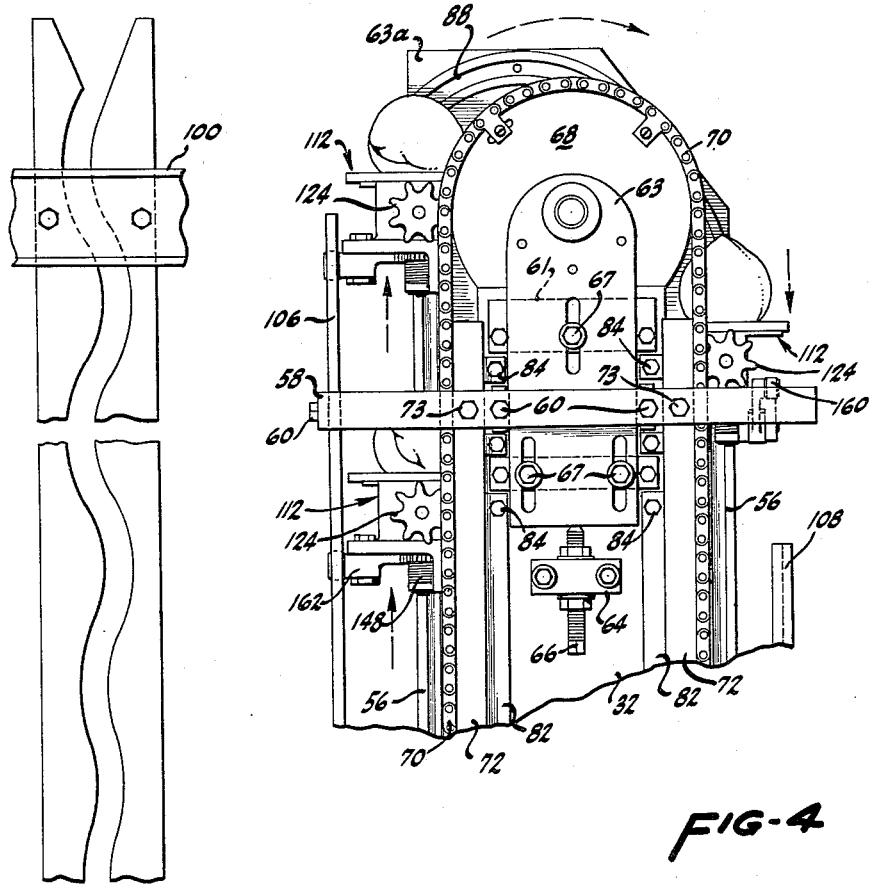
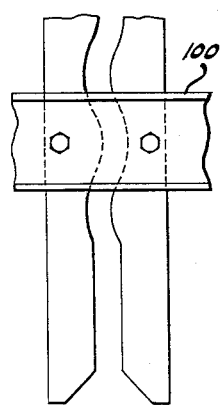
FIG-4
FIG-6

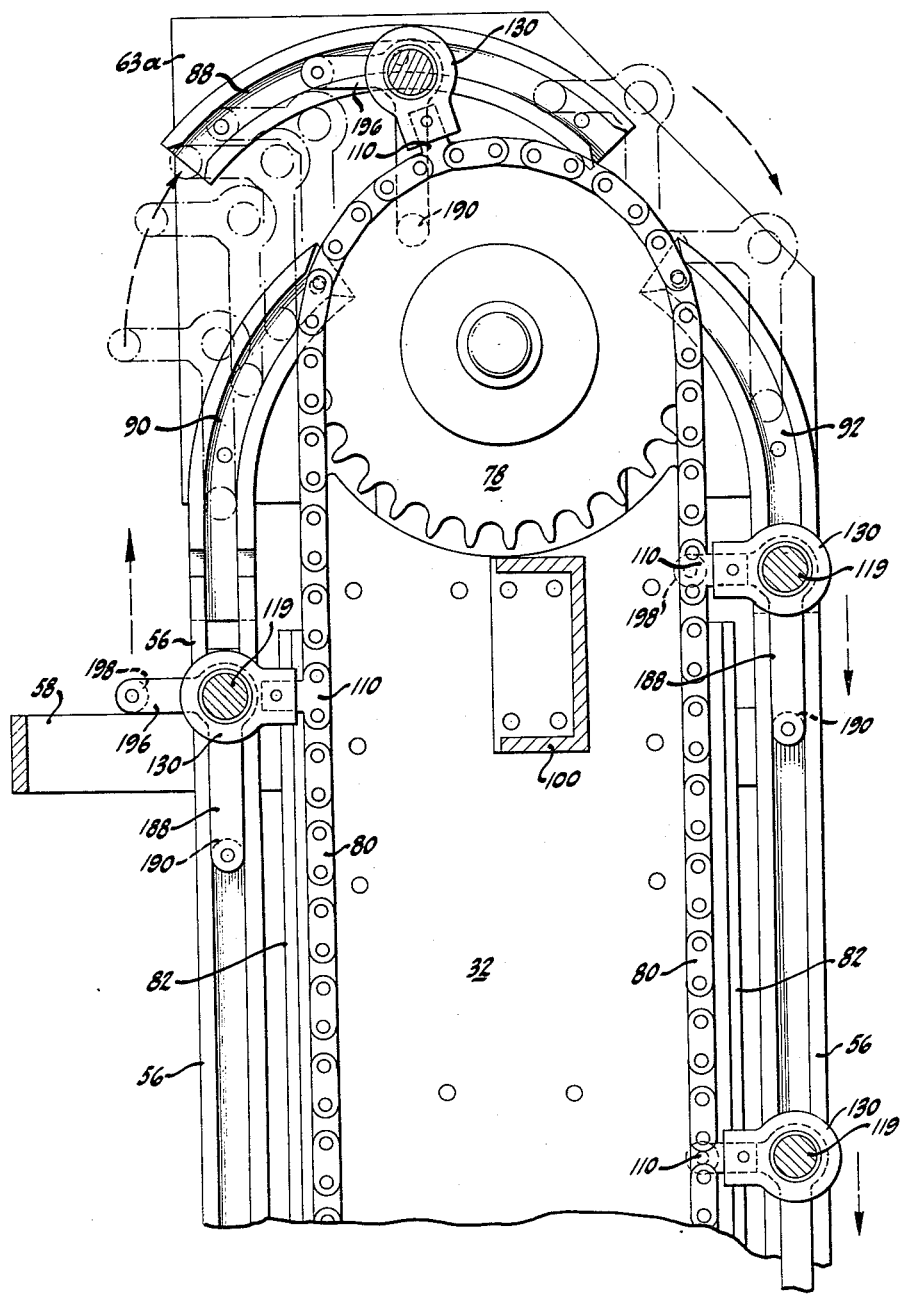

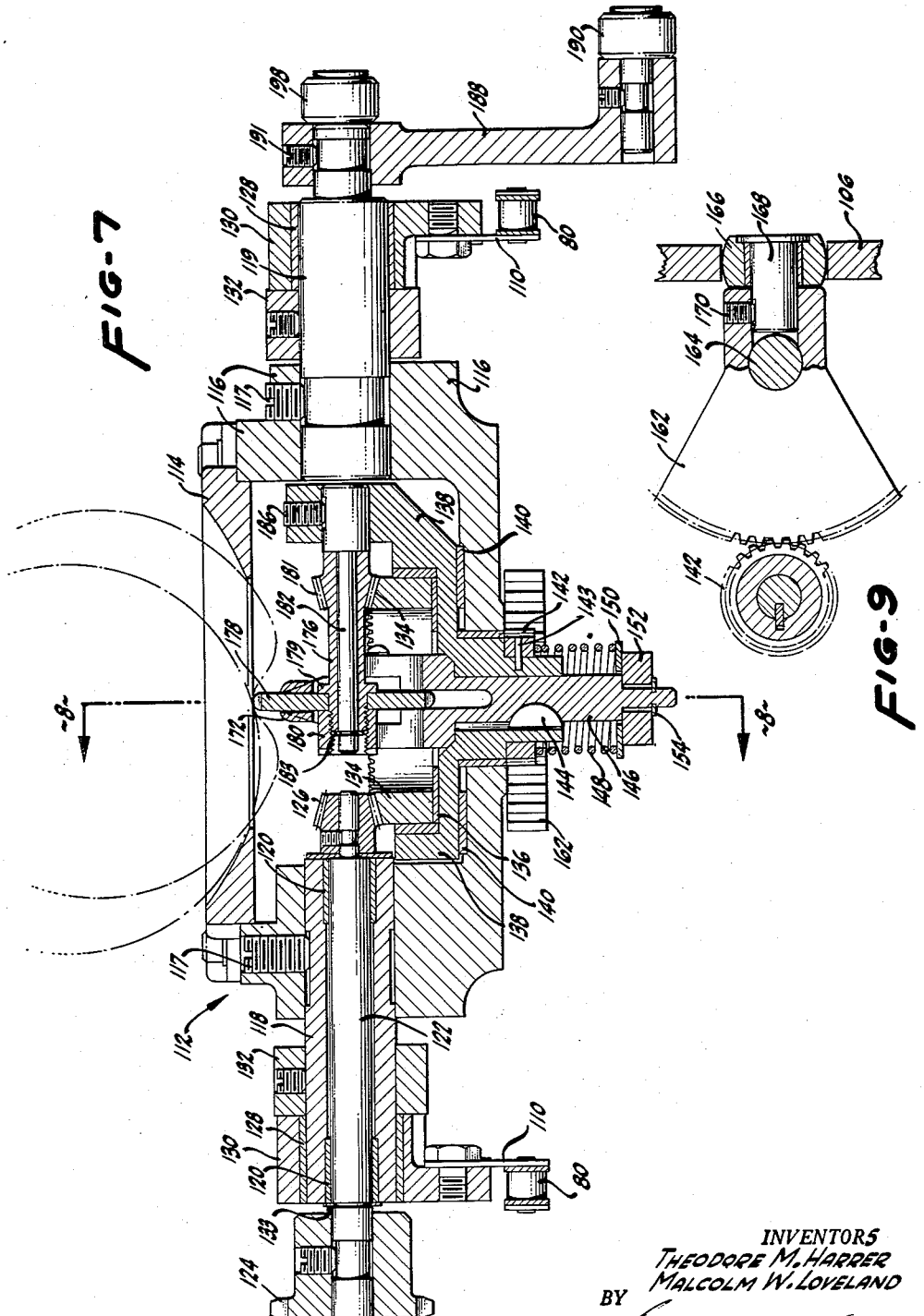

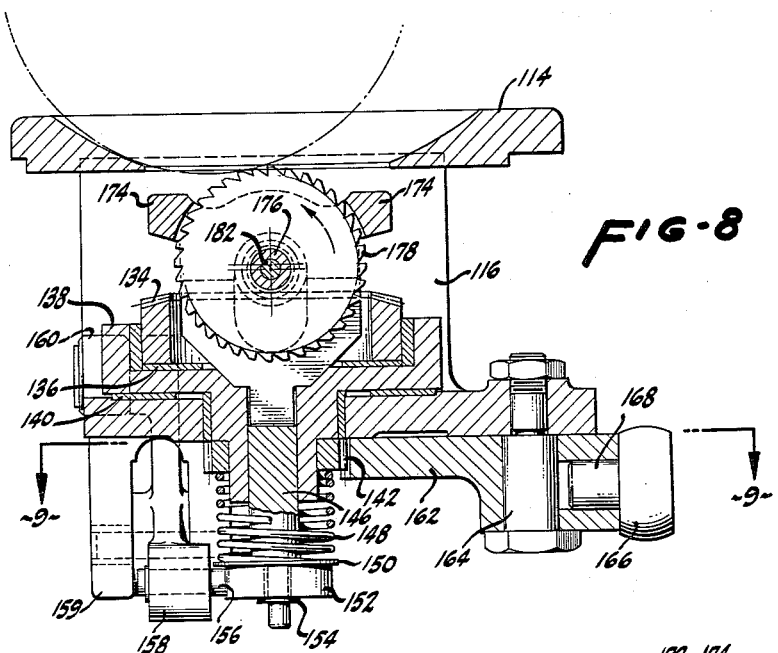
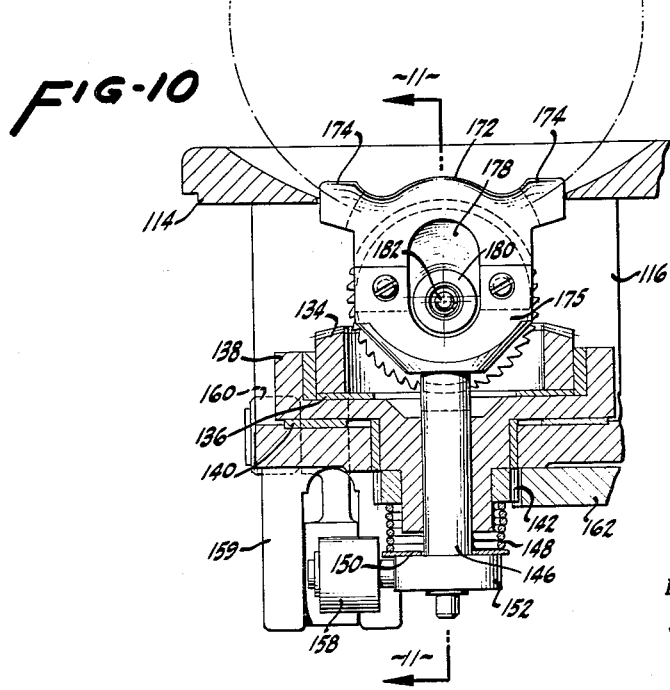
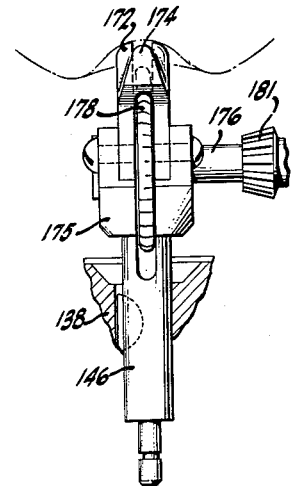

ATTORNEYS

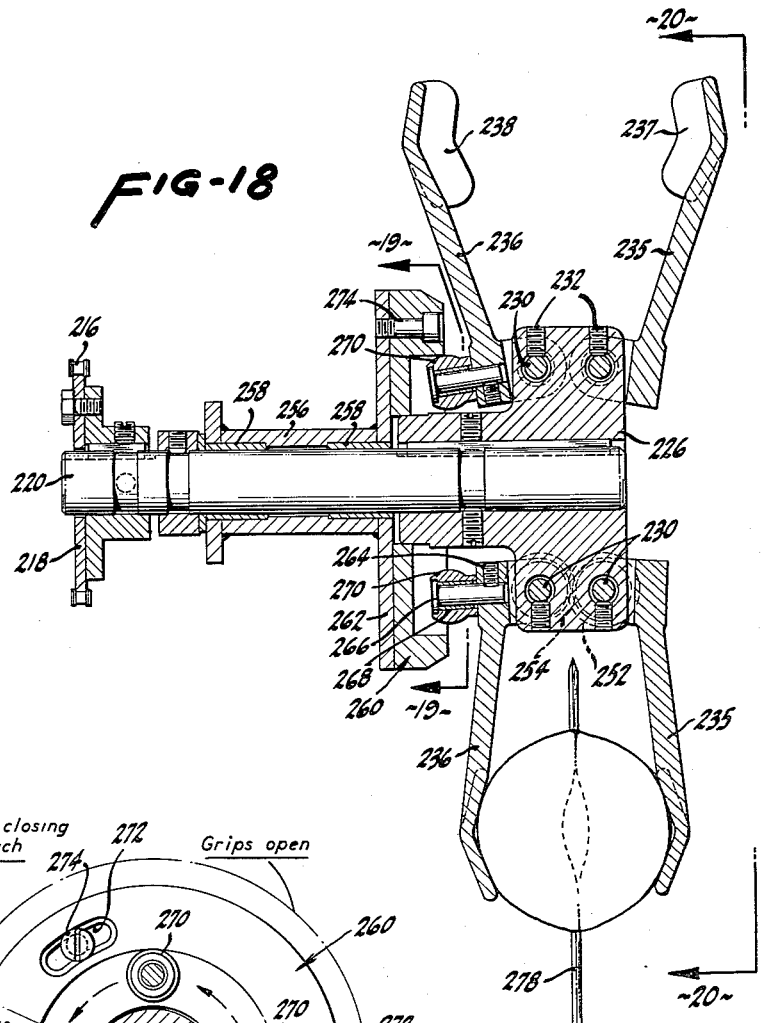
FIG-18
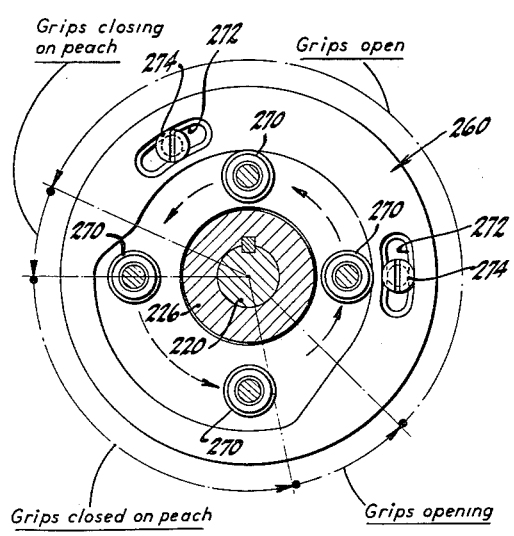
FIG-19
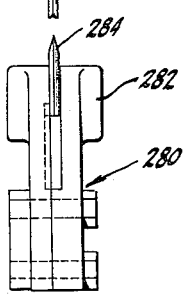
INVENTORS
THEODORE M. HARRER
MALCOLM W. LOVELAND
BY
ATTORNEYS

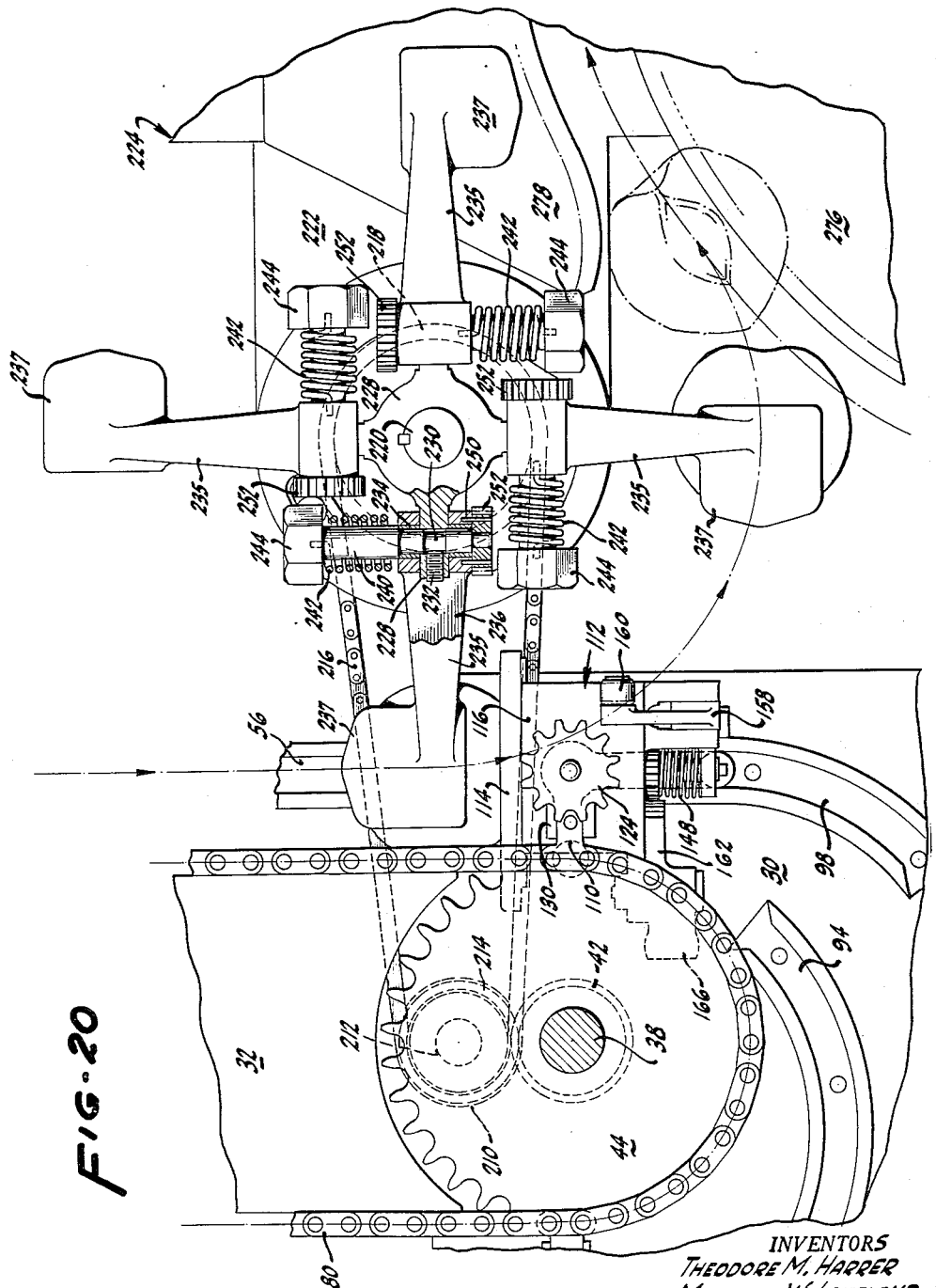

3,118,530
Patented Jan. 21, 1964

3,118,530
FRUIT ORIENTOR
Theodore M. Harrer and Malcolm W. Loveland, Orinda, Calif., assignors to Atlas Pacific Engineering Company, a corporation of California
Filed Dec. 21, 1960, Ser. No. 77,421
16 Claims. (Cl. 198—33)

This invention relates to a method and apparatus for handling and properly orienting fruit, such as peaches and the like, preparatory to feeding such fruit to a processing machine such as one for halving and pitting the fruit.

Fruit orientors have been constructed heretofore utilizing a small wheel which is driven while the fruit is in contact therewith whereby to provide means for finding the stem end. It has been proposed also to oscillate the wheel from side to side whereby to provide means for aligning the suture plane of the fruit with the plane of the wheel. Through this combination of the rotary and oscillatory motion, these machines, with greater or lesser success, orient the fruit so that it may be fed to a knife, cut at the suture and the pit removed. However, the use of a wheel both to "find" the stem indent and orient so that the suture plane lies parallel to the wheel surface has not been entirely successful. The stem indent is usually "found" before the suture plane is properly aligned, but the continued rotation of the wheel often results in the fruit being further rotated about its horizontal axis and the stem indent being "lost."

It is therefore an object of this invention to provide a method and apparatus for orienting fruit, e.g. peaches, with the stem indent downwardly and the suture in a predetermined plane.

It is a further object of this invention to provide a method and apparatus of the type aforementioned wherein the steps of placing the stem indent downwardly and orienting the suture plane are carried out in an essentially sequential fashion, and preferably by the use of separate elements which do not tend to rotate the fruit about a horizontal axis after the stem indent has been directed downwardly.

Yet another object of this invention is to provide a relatively compact orienting and transferring apparatus to be used in conjunction with a halving and pitting machine.

Still another object of this invention is to provide a machine of the type aforementioned wherein proper orientation of the fruit is achieved as it moves vertically whereby to permit substantial space-saving over machines which effect proper orientation as the fruit is moved horizontally.

A further object of this invention is to provide a peach orientor utilizing a continuously moving vertical conveyor having fruit supports mounted thereon in such a fashion that throughout the upward and downward cycles of the conveyor, the fruit supports remain upright.

Another object of this invention is to provide a transfer mechanism movable congruently with the peach supports of an endless conveyor for grasping properly oriented peaches and feeding such peaches, while maintaining their proper orientation, to a peach halving and pitting mechanism.

Ancillary objects and advantages of this invention, if not specifically set forth, will become apparent during the course of the description which follows.

In the drawings:

FIGURE 4 is an enlarged fragmentary side elevation of the topmost portion of the orientor taken on the line 4—4 of FIGURE 2.

FIGURE 5 is an enlarged fragmentary view taken on the line 5—5 of FIGURE 2 showing, in phantom view, the relationship of various parts at closely spaced intervals during the conveying cycle.

FIGURE 6 is a view on the line 6—6 of FIGURE 3 showing one of several cams which are used.

Figure 3:
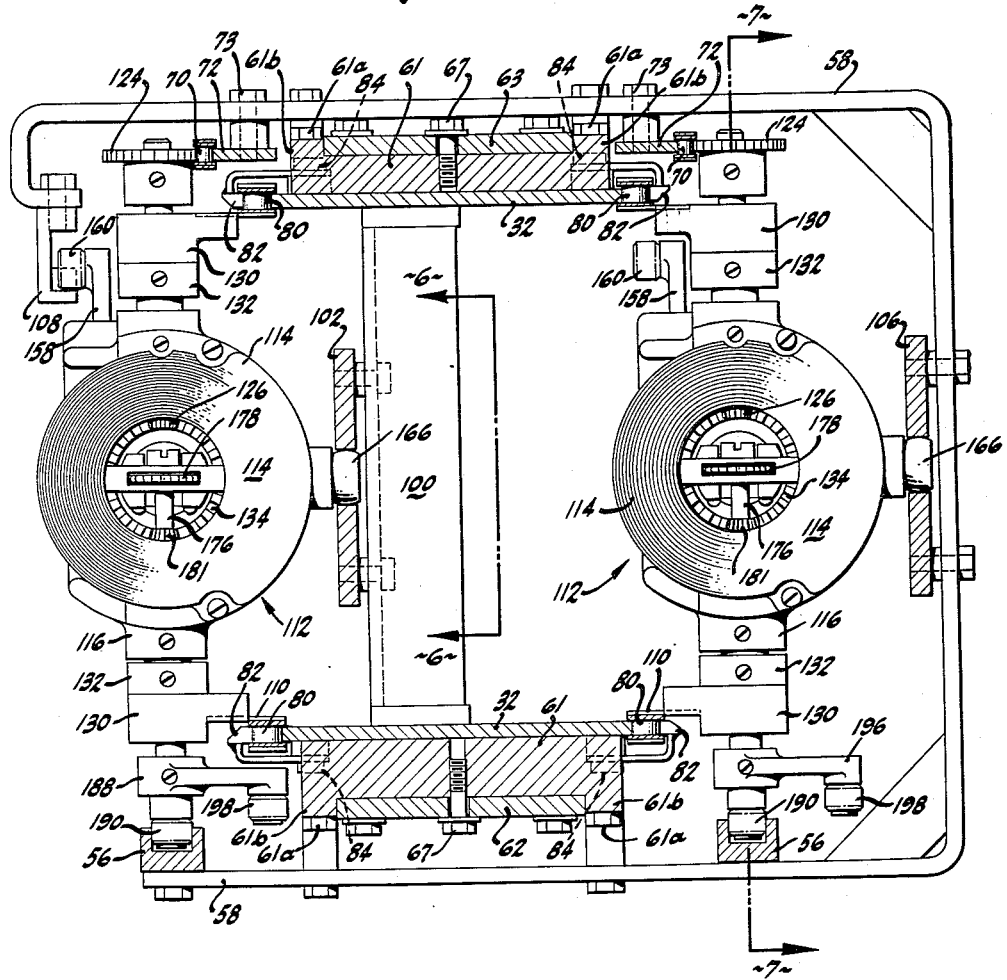
FIGURE 3 is an enlarged plan view, partially in section, of the orientor, taken on the line 3—3 of FIGURE 1.

FIGURE 7 is an enlarged sectional view on the line 7—7 of FIGURE 3 showing in detail the structure of one of the fruit-supporting dishes, with elements 80 and 110 being shown rotated 90° from their position in FIGURE 3, thus to permit them to appear in FIGURE 7.

FIGURE 8 is an enlarged sectional view on the line 8—8 of FIGURE 7.

FIGURE 9 is a sectional view taken on the line 9—9 of FIGURE 8 showing, in plan view, the manner in which a cam, cam follower and associated gears cooperate to oscillate the stem indent-finding wheel and associated shield.

FIGURE 10 is a view similar to FIGURE 8 showing the aforementioned shield in an extended or raised position.

FIGURE 11 is a partial sectional end elevation taken on the line 11—11 of FIGURE 10.

FIGURES 12–17 inclusive are diagrammatic illustrations exemplary of the manner in which the stem indent-finding wheel operates to orient a peach or the like fruit with its stem indent downward and the manner in which the wheel shield operates to orient the suture plane.

Figure 1:
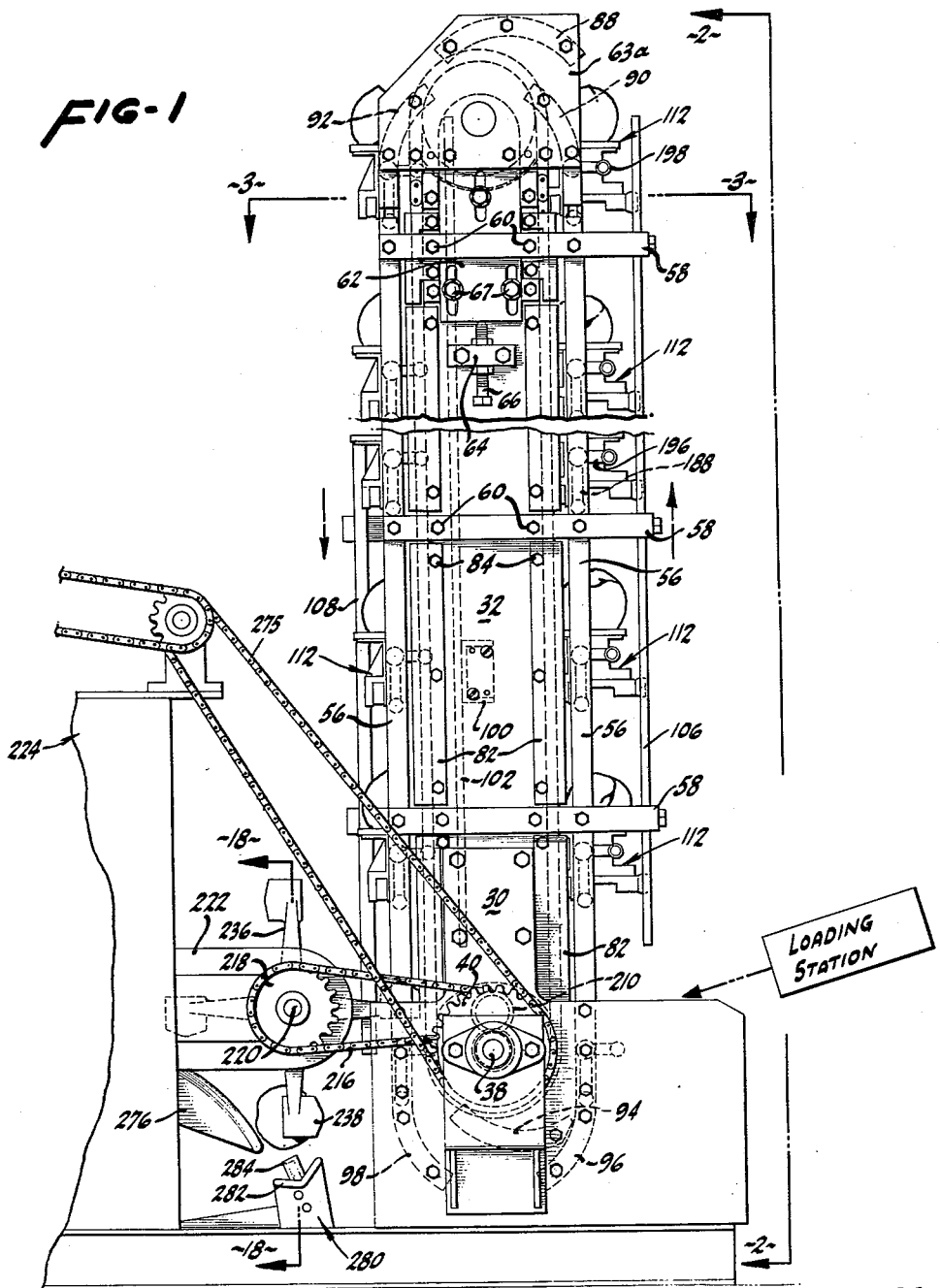
FIGURE 1 is a side elevation of the orienting and transferring mechanism of this invention, which is disposed between a bulk feed mechanism, not shown, and a halver and pitter, shown generally at the left of FIGURE 1.

FIGURE 18 is an enlarged sectional end elevation of the transfer mechanism taken along the line 18—18 of FIGURE 1.

FIGURE 19 is a fragmentary view on the line 19—19 of FIGURE 18 showing the structure of the cam which governs the operation of the mechanism used to grip the fruit after it has been oriented properly.

FIGURE 20 is a side elevation on the line 20—20 of FIGURE 18 with that portion of the orientor adjacent the fruit discharge station added to show the manner of co-operation of the orientor and transfer mechanism.

Generally, the apparatus of this invention comprises a narrow, vertical conveyor and orientor positioned between a bulk feed mechanism and a machine designed to halve peaches or similar fruit along the plane of suture of the fruit. The device operates in an essentially sequential fashion to orient the fruit with the stem indent downwardly and thereafter to orient the suture of the fruit into a predetermined plane. A conveyor is provided with individual peach supports, the latter being so mounted and constructed that the fruit is first elevated and then lowered on first one and then the other side of the conveyor and remains upright throughout the period of its transit from the conveyor loading station to the discharge station. Finally, a transfer mechanism employing cooperating grips removes the oriented fruit from the conveyor and feeds it to the knife or knives of a fruit halver and pitter.

Figure 2:
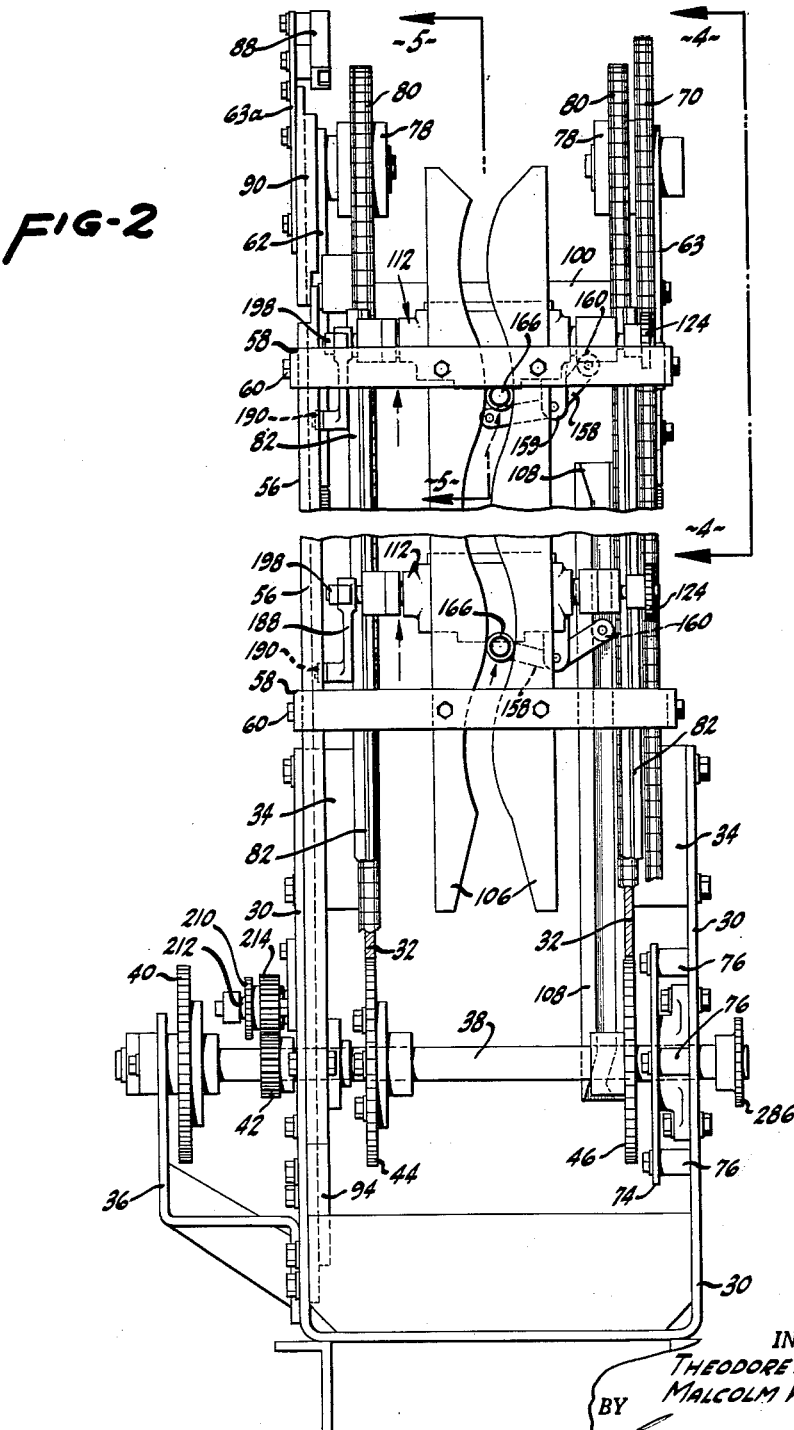
FIGURE 2 is an end elevation of the orienting mechanism of this invention on the line 2—2 of FIGURE 1.

Referring now to the drawings wherein like characters refer to like parts throughout, to frame 30 is bolted upright side plates 32, spaced inwardly from frame 30 by means of spacer blocks 34. Bracket 36, as seen in FIGURE 2, is bolted to one side of the frame and shaft 38 is journaled for rotation therein and in the frame 30 and has keyed thereto sprocket 40, gear 42, and sprockets 44 and 46. Bolted to the frame 30 are a pair of upright cam tracks 56, one of which may be seen at the left in FIGURE 2 and both of which appear in FIGURE 1.

Bolted to the exposed surfaces of the cam tracks 56, as seen in FIGURE 1, are a plurality of vertically spaced U-shaped brackets 58 which are also secured to plates 32 by means of bolts 60. Adjustably mounted on spacer blocks 61, in turn bolted to plates 32 by means of bolts 61a, (see FIGURE 3), are plates 62 and 63, the latter of which supports an additional plate 63a. Each spacer block has a boss 61b at either end thereof through which bolt 61a passes and which serves to guide and hold plate 62 or 63. Bolted to each of plates 32 is a bracket 64 supporting set screw 66, the screw providing means for raising plates 62 and 63, if necessary. The plates 62 and 63 are slotted for receipt of bolts 67 which are tapped into spacer blocks 61 whereby to permit adjustment of the plates. Mounted at the top end of plate 63 is a stationary arcuate member 68 which supports chain 70 (see FIGURE 4). From the support 68, the chain passes downwardly closely adjacent the guides 72 which, in turn, are secured to brackets 58 by means of bolts 73 which are provided with suitable spacers, as seen in FIGURE 3. At this lowermost end, the chain passes about the stationary arcuate member 74 which, aligned with arcuate member 68 by means of spacers 76, is bolted to the frame 30.

Journaled in bearings mounted on plates 62 and 63 are opposing sprockets 78 about which are reeved endless link chains 80. These pass along the longitudinal edges of plates 32 and about sprockets 44 and 46 at the base of the apparatus. Because of the weight which they support, chains 80 have a tendency to pull away from the plates 32; to prevent this, bracket-supported chain guides 82 are secured to plates 32 by means of bolts 84. In FIGURE 2 the chain guides 82 are shown broken away slightly (at the lower third of the figure) to expose the chains 80; the chains in turn are shown broken away so as to expose the underlying plates 32.

Adjustable plate 63a also supports three arcuate cam track segments 88, 90, and 92. The segments 90 and 92 mate with one or the other of vertical cam tracks 56. There is approximately an 80° trackless segment between the upper end of tracks 90 and 92. The function of cam track segment 88 and the reason for the aforementioned trackless segment will be described in greater detail hereinafter. A similar arrangement is provided directly thereunderneath at the base of one of side plates 32 wherein three separate cam segments 94, 96 and 98 are provided. As will be pointed out hereinafter, these operate in much the same fashion as cam track segments 88, 90 and 92 to cause individual units carried by the conveyor to remain continually in an upright position, even while the units are passing from one side to another of a sprocket wheel and reversing their direction of travel.

As seen in FIGURES 1, 3, 5 and 6, channels 100 bridge the space between each of the plates 32 and are secured thereto. To these channels is secured a vertical cam 102. A second vertical cam 106 is bolted to the U-shaped brackets 58. Cam 102 is on the "down" side of the conveyor and cam 106 is on the "up" side of the conveyor. The extreme ends of brackets 58 also support the straight vertical cam track 108, also mounted on the "down" side of the conveyor near the conveyor discharging station.

At spaced intervals along the chains 80 are secured, by means of chain attachment links 110, a series of fruit-supporting units, generally 112. These may be seen in plan view in FIGURE 3 and in detail in FIGURES 7, 8, 9, 10 and 11. Each unit consists of a shallow dish 114 having a centrally disposed hole, the hole being of such a size that a small portion of the fruit will rest below the lowermost surface of the dish in the absence of additional support from beneath. The dish is bolted to the housing 116 which in turn is fixed, by means of set screws 117, to the sleeve 118 and to shaft 119, as seen in FIGURE 7. Rotatably supported within the sleeve 118 by means of bearings 120 is shaft 122, to the exposed end of which is keyed sprocket wheel 124. A bevel gear 126 is keyed to the stub of the shaft 122. Rotatably mounted concentrically about the sleeve 118 and shaft 119 by means of bushings 128 are collars 130 from which the entire assembly is suspended. Spacers 132, held in place by set screws, abut collars 130 to position the housing 116 centrally between the chains 80. Snap ring 133 (seen at the left of FIGURE 7) and gear 126 together position shaft 122 within sleeve 118. The bevel gear 126 meshes with ring gear 134, in turn resting on bearings 136, which are supported by the base member 138. The base is mounted for rotary motion relative to housing 116 by means of the bearings 140. Pinion gear 142 is keyed about the hub of the base 138 by pin 143. The inner surface of the hub of the base 138 is provided with a longitudinal slot in which slides key 144 which is integral with shaft 146. The shaft 146 thus rotates with base 138 but may be forced upwardly against the resistance of compression spring 148 which rests against the pinion gear 142 at its upper end and against washer 150 at its lower end, the washer 152 in turn being held in place by collar 152 which is rotatably mounted about the stub of shaft 146 on which it fits loosely as may be seen in FIGS. 7 and 8. The washer is held in place by snap ring 154. As seen in FIGURES 8 and 10, collar 152 supports the shaft 156 to which is pivoted the crank arm 158, which is also pivoted to bracket 159 and supports cam roller 160. When the fruit supporting assembly 112 traverses the downward portion of its path, the roller 160 rides in cam 108, as shown in FIGURES 2 and 3, thus raising shaft 146, yoke 175 and shield 172 to the position shown in FIGURE 10.

As seen in FIGURE 9, the pinion gear 142 meshes with a sector gear 162 which in turn is pivoted about pin 164. The cam roller 166 is journaled for rotation about shaft 168, in turn secured opposite the sector gear 162 by set screw 170. Shield 172, having a pair of fingers 174 at either extremity, and yoke 175 are supported by shaft 146. When secured together, as seen in FIGURE 8, the shield 172 and yoke 175 exhibit an elongated hole crossing their line of juncture so as to admit sleeve 176 and to permit the shield and yoke to be raised and lowered without interfering with sleeve 176. The serrated wheel 178 is secured in place on the sleeve against ring flange 179 by nut 180 and sleeve 176 has an integral concentric bevel gear 181 which meshes with the ring gear 134. Sleeve 176 is secured about spindle 182 by snap ring 183, and the spindle is secured to the base 138 by set screw 186.

Considering now the right-hand portion of FIGURE 7, there is shown a crank arm 188 having a cam roller 190 at one end thereof, which crank arm is fixed by set screw 191 to shaft 119 parallel to the wheel-supporting shaft 146. A second crank arm 196 and cam roller 198 are rotatably mounted thereon, the arm 196 being at a right angle to the arm 188 to form a bell crank assembly. The relationship of the crank arms is best seen in FIGURE 5. As can be seen in this figure, roller 190 rides in either of cam tracks 56 excepting at the topmost and lowermost portions of the conveyor circuit, at which times the roller 190 is disengaged and roller 198 enters track 88 or 94. The supporting collar 130 rotates as the relationship of the chain 80 and the fruit support assembly changes, but the dish surface 114 is maintained upright at all times. Note that no cam track appears between the upper ends of tracks 90 and 92 and between the lowermost ends of arcuate tracks 96 and 98 so that the remaining spaced cam track 88 or 94 may alone govern the position of the dish surface and binding may be avoided.

As chain 80 advances any one assembly, sprocket 124 (see FIGURE 4), which is in engagement with stationary chain 70, causes shaft 122 to rotate, thus turning bevel gear 126 and continuously rotating ring gear 134. The ring gear in turn rotates bevel gear 181 causing the serrated wheel 178 to be rotated at a constant speed. Non-uniform rotation as well as oscillation of the wheel and shield 172 is introduced by oscillating the base 138 through the action of pinion 142, sector gear 162, follower 166 and cam 102 or 106 (see FIGURES 8 and 9).

FIGURES 18–20 show in detail the structure of the transfer mechanism used to remove the properly oriented fruit at the fruit discharge station (the lower left-hand side of FIGURE 1), and thereafter feed it to a knife or cooperating knives of a halver and pitter. The 4-armed rotating transfer mechanism is driven through sprocket 210 which is keyed to shaft 212 (see FIGURE 2) journaled in the frame 30, the shaft 212 being driven by gear 214 which is also keyed to the shaft 212 and which meshes with gear 42. Endless link chain 216 is reeved about sprocket 218, in turn keyed to shaft 220 which is journaled in bracket 222 supported by the pitter 224. Also keyed to the shaft 220 is the hub 226. Spaced at 90° angles about the hub 226 are the supporting brackets 228, each of which is provided with a pair of holes for receipt of pins 230 which are held in place by set screws 232. Bushings 234 permit the arms 235 and 236 to pivot about the pins. The arms support cooperating grips 237 and 238.

The stud 240, which is integral with pin 230, has one end of a helical spring 242 secured in the head 244 thereof, and the other end of the spring is held by the arm 235 or 236. Secured to the arms 235 and 236 by means of suitable pins 250 are the gears 252 and 254, which mesh with one another so that the two arms 235 and 236 pivot simultaneously about their respective pins 230.

Attention is now directed to FIGURE 18; supported by the bracket 222 on the side of the transfer mechanism opposite that seen in FIGURE 20 is the journal 256 which supports bearings 258 for the shaft 220. Circular cam track 260 is bolted to ring flange 262 of the journal which, in turn, is integral with bracket 222. The configuration of the cam is seen in FIGURE 19. Each of arms 236 has secured perpendicularly thereto by means of set screw 264 a pin 266 which supports bearings 268 for cam follower 270. The follower, as seen in FIGURE 18, rides within the track of cam 260, thus permitting grips 237 and 238 to be urged closed under the influence of springs 242 when each pair of arms is at the bottom of its rotary cycle. Precise adjustment of the opening and closing cycle of the grips is provided by the slotted mounting 272 through which passes the bolts 274 which serve to hold the cam 260 in place on the flange 262.

In operation, power is supplied by a prime mover, not shown, through the endless link chain 275 reeved about sprocket 40 and, in turn, gears 42 and 214 rotate, thus driving sprocket 210 and rotating arms 235 and 236. Sprockets 44 and 46 are turned and the endless link chains 80 carrying the spaced fruit orientors 112 are advanced in the direction of the arrows appearing in FIGURES 1, 4 and 5. Any suitable feed means may be used to place peaches or other similar fruit having a stem indent and a suture at random in position on individual dishes 114 as the dishes move upward from the loading station which appears at the lower right of FIGURE 1. Sprocket wheel 124 of each fruit supporting unit is engaged by the links of stationary chain 70, with the result that shaft 122 is rotated together with bevel gear 126, and this in turn rotates ring gear 134 at a uniform speed. The ring gear meshes with bevel gear 181 driving the serrated wheel 178 so as to cause the fruit to be rotated about its horizontal axis. Preferably, the wheel 178 is mounted slightly eccentrically on its supporting sleeve 176, thus to cause the fruit to be moved in a somewhat more random fashion. As seen in FIGURES 1 and 2, cam track 106 does not extend entirely to the base of the structure and until such time as cam follower 166 engages the track, the wheel 178 will be rotated at a constant speed. However, when the follower engages the track of cam 106, segment gear 162 will be caused to oscillate about pin 164, thus oscillating pinion gear 142, in turn transmitting this oscillatory motion to the entire base 138. It will be seen that when pinion gear 142 is rotated in a direction opposite to the direction of motion of the ring gear 134, the motion of the base 138 supporting spindle 182 and, in turn, gear 181, and the independent motion of the ring gear through shaft 122, will be additive and wheel 178 will be driven at an increased speed, where rotation of the pinion gear 142 in the same direction as ring gear 134 will tend to rotate the bevel gear 181 more slowly and will slow, stop or reverse the rotation of wheel 178, depending on the rate of change of cam 106. Cam 106 oscillates the shield 172 and wheel 178 about 180° about their vertical axes; as the rotating wheel "seeks" the stem indent of the fruit, the oscillating action tends to align the suture plane with the plane of the wheel 178. To some extent, this is in accordance with the customary practice in fruit orientors, the chief departure here being the random motion of the wheel contributed by the dual wheel drive mechanism including shaft 122 and base 138. A major departure, however, resides in the discovery that while cam track 106 may be used to limited advantage, it is not an indispensible element for reasons which will be pointed out hereinafter.

The individual dishes are maintained in an upright orientation by the cooperation of the various cam tracks and followers, as more particularly seen in FIGURE 5. During the upward cycle, the vertically depending crank arm supporting cam follower 190 holds the dish 114 upright. Near the top of the cycle, follower 190 becomes disengaged, and follower 198 engages track 88, and following completion of an approximate 90° "ferris wheel" action, the follower 198 disengages from cam track 88 and follower 190, now in its downward cycle, engages track 92. The use of the aforementioned separate track 88 and a corresponding separate track 94 at the base of the conveyor has been found necessary to afford a means of maintaining the individual fruit dishes 114 upward at all times while avoiding the possibility of a follower remaining stationary while the endless link chains pass over or under the sprockets about which they are reeved, thus tending to rotate dish 114 about the axis 119 resulting in a binding of follower 190 in the cam track as the dish approaches the topmost or bottom-most point.

Figure 12:
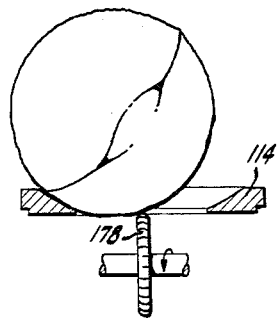
Figure 13:
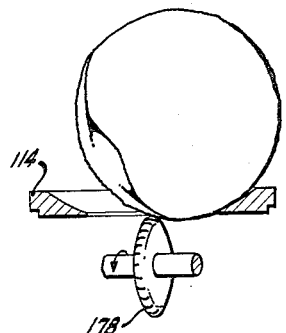
Figure 14:
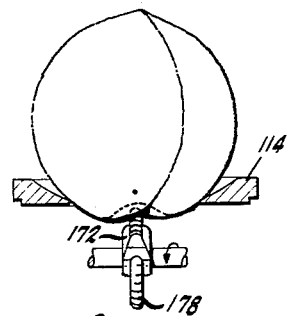
Figure 15:
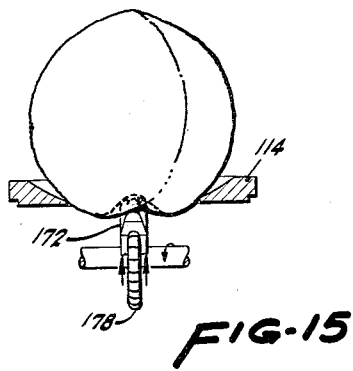
Figure 16:
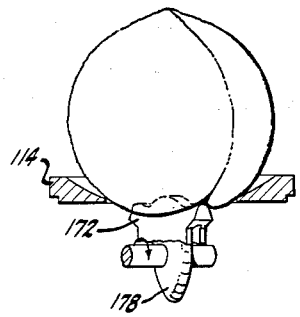
Figure 17:
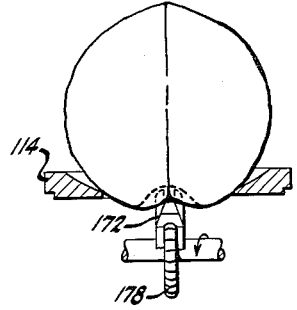

The conveyor should be of such a height that the fruit being oriented, e.g. peaches, will have been aligned, through the action of wheel 178, with the stem indents downwardly when they reach the top of the conveyor. A typical sequence of peach positions relative to the supporting dishes 114 may be seen in the first of the three diagrammatic illustrations 12–14. In FIGURE 12, a peach is shown immediately after random placement on the dish. The erratic rotation of the wheel 178 orients the peach with the stem indent downwardly but, in most instances, as seen in FIGURE 14, which represents the position of the peach shown in the upper right-hand corner of FIGURE 1, the suture plane will, at this point, be at some acute angle to the plane of the wheel. However, the peach is no longer supported by the wheel and hence, for the first time, seats itself in dish 114, as shown in FIGURE 14.

As the fruit-supporting unit moves downwardly, as seen at the left of FIGURE 1, the follower 166 engages the top of cam track 102. Also, follower 160 engages the track of cam 108. Crank arm 158 is forced downwardly, as seen in FIGURE 2, and the entire assembly, including collar 152, supporting shaft 146, yoke 175 and shield 172, is raised, as seen in FIGURE 10. Thus, shortly after initiating the downward cycle, the rotating wheel 178 is no longer permitted to contact the peach, so that, with the stem indent once having been found, the peach may not thereafter be turned over and the stem indent turned upwardly again. Rather, only the shield 172 contacts the peach with the center raised portion fitting into the stem indent. Since the follower 166 is engaged with track 102, however, the shield 172 continues to oscillate until the suture plane becomes aligned with that of the shield. This latter sequence of events is typified in diagrammatic FIGURES 15–17.

If the peach becomes oriented with its stem indent downwardly immediately after being fed to the conveyor, the fingers 174 of the shield 172 tend to retain the peach out of contact with the rotating wheel 178, to at least a limited extent, and will thus limit the tendency of the peach to be again overturned. That is, the rotating wheel will fit within the stem indent, and contact with the fruit will be minimized.

Because of the foregoing sequence of events and functions, the proper orientation of the peach is obtained with greater certainty than is the case where only a single device, e.g. the conventional rotating and oscillating wheel, aligns the plane of suture and orients the stem indent downwardly. The possibility of misorienting the fruit after it has once been oriented is minimized.

The transfer mechanism including grips 237 and 238 may then remove the peach from the conveyor, as the conveyor-mounted support "ferris wheels" about sprockets 44 and 46. The speed of rotation of the transfer mechanism is synchronized to that of the conveyor by means of the gears 42 and 214 and the conveyor-mounted supports are spaced so that a pair of grips will envelop a peach as a pair of arms 235 and 236 reach the horizontal. Immediately thereafter, the cam follower 270 becomes disengaged from the inner surface of the cam track 260, and under the influence of helical springs 242 the arms pivot inwardly about pins 230, thus to grip an individual peach and, while maintaining its proper orientation, feed it toward the lowermost edge of knife 276. Halvers and pitters generally employ two knives 276 and 278 together with oscillating arm 280, to which is attached a bracket having a V-shaped pusher member 282 and a knife 284. Grips 237 and 238 deposit fruit on the upstanding edge of knife 276 at a point in time just subsequent to that shown in FIGURE 1. Cam follower 270 then contacts the inner surface of the cam 260, thus releasing the grips and the pusher member and associated knife 284 advance the peach into the pitting mechanism. A number of pitters have been described which operate in this fashion and hence further details are unnecessary here.

As pointed out earlier, any conventional mechanical or manual feed may be employed. Operation of such a conventional mechanical feed can be provided in timed relation to the operation of the orienting mechanism by driving such conventional mechanical feed from sprocket 286 keyed to shaft 38, as shown in FIGURE 2.

Also, one of the most important features of this invention, i.e. the sequential rotation of fruit about its horizontal axis and oscillation about a vertical axis, without rotation, may be obtained in a somewhat less effective fashion by replacing the shield 172 with means operative when a conveyor-mounted support has reached the top of its cycle to cause the wheel to cease rotating. This may be achieved by eliminating the "downward" portion of chain 70. The essential feature, the elimination of the application of rotary force to the base of the peach, would thus be obtained, though in a somewhat less satisfactory fashion than described in detail above.

Obviously, many modifications and variations of this invention may be made without departing from the spirit and scope thereof, and therefore only those limitations should be imposed as are indicated in the appended claims.

We claim:

1. Means for orienting indented fruit having a suture about the circumference thereof comprising: means for loosely supporting said fruit while exposing the bottom-most portion theerof; a rotatable wheel for turning said fruit about its horizontal axis, said wheel being arranged and proportioned to contact the bottom of said fruit when said fruit rests upon said supporting means, means for rotating said wheel at different rates while the wheel is in contact with the fruit; non-rotating retractable means so positioned as to be capable of contacting the bottom-most portion of said fruit and preventing contact of said wheel with said fruit when said retractable means is extended, said non-rotating means having an uppermost edge so proportioned as to be capable of registry with the suture of said fruit; and means for oscillating said non-rotating means about its vertical axis whereby to cause registry of the said uppermost edge of said non-rotating means with said suture.

2. Means for orienting indented fruit having a suture about the circumference thereof comprising: means for loosely supporting said fruit while exposing the bottom-most portion thereof; a rotating, vertically-positioned wheel, said wheel being arranged and proportioned to contact the bottom of said fruit when said fruit rests upon said supporting means; an elongated retractable shield for said wheel, said shield having an uppermost edge proportioned for registry with the suture of said fruit, said shield being so positioned that when extended said uppermost edge of said shield contacts said fruit and prevents contact of said fruit with said wheel; and means for oscillating said shield about its vertical axis whereby to cause said registry of the uppermost edge of said shield with said suture.

3. Means for orienting indented fruit having a suture about the circumference thereof comprising: an endless conveyor having a fruit loading station and a fruit discharging station and having spaced therealong a plurality of means for loosely supporting said fruit while exposing the bottom-most portion thereof, each of said fruit-supporting means being provided with a rotatable wheel positioned vertically, said wheel being arranged and proportioned to contact the bottom of said fruit when said fruit rests upon said supporting means; a retractable shield for each of said wheels, said shield having the uppermost edge thereof proportioned for registry with the suture of said fruit, said shield being so positioned that when extended, said uppermost edge of said shield contacts said fruit and prevents contact of said fruit with said wheel; means positioned at a point immediately following the fruit loading station for rotating the said wheels; means positioned along said conveyor path at a point preceding said fruit discharging station for extending said shield whereby to cause said registry of the uppermost edge of the said shield with the said suture; and means for oscillating said shield about its vertical axis, said shield-oscillating means being positioned along the said conveyor path at a point preceding said fruit discharging station.

4. An endless conveyor arranged vertically having a fruit loading station at the base of one side thereof and a fruit discharging station at the base of the other side thereof, said conveyor having means thereon for orienting indented fruit having a suture about the circumference thereof, said orienting means comprising means carried by said conveyor for loosely supporting said fruit while exposing the bottom-most portion thereof, each of said fruit-supporting means being provided with a vertically-disposed rotatable wheel, said wheel being arranged and proportioned to contact the bottom of said fruit when said fruit rests upon said supporting means, said wheel being supported by a shaft rotatably mounted on said fruit-supporting means; a stationary element positioned along said conveyor path, the said shaft having means thereon for contacting said stationary element whereby to rotate the said shaft and the said wheel; a retractable shield for said wheel having the uppermost edge thereof proportioned for registry with the suture of said fruit, said shield being so positioned that when extended, said shield contacts said fruit and prevents contact of said fruit with the said wheel; means pivoted to the said fruit-supporting means and secured to the said shield for extending the said shield when said means is pivoted; means positioned along the conveyor path at a point preceding the said fruit discharging station for engaging and pivoting the said shield-extending means; and means for oscillating said shield about its vertical axis.

5. Means for orienting indented fruit having a suture about the circumference thereof comprising: an endless, vertically-positioned conveyor having a fruit loading station at one point near the base thereof and a fruit discharging station on the opposite side near the base thereof; means mounted upon and carried by the said endless conveyor for loosely supporting said fruit while exposing the bottom-most portion thereof, each of said fruit-supporting means being provided with a vertically-projecting rotatable wheel, said wheel being arranged and proportioned to contact the bottom of said fruit when said fruit rests upon said supporting means, said wheel being supported by a shaft rotatably mounted on said fruit-supporting means; a stationary element positioned along said conveyor path, the said shaft having means on one end thereof for contacting said stationary element whereby to provide means for rotating the said shaft; an elongated retractable shield for said wheel having the uppermost edge thereof proportioned for registry with the suture of said fruit, said shield being so positioned that when extended said shield contacts said fruit and prevents contact of the said fruit with said wheel; a shield-extending means operatively associated with the said shield, the said means including a bell crank pivoted to said fruit-supporting means, secured to the said shield and having a cam follower on one end thereof; a cam positioned along the said conveyor path at a point preceding the fruit discharging station, the said cam being positioned and proportioned for registry with the said cam follower of the said bell crank; and means for oscillating said shield about its vertical axis whereby to cause said registry of the said uppermost surface of said shield with said suture, said means comprising a cam follower operatively associated with the said shield and a cam secured along the said conveyor path at a point preceding the fruit discharging station, the said cam having an undulating track therein, said cam being positioned and proportioned for receipt of the said cam follower operatively associated with the said shield.

6. Means for orienting indented fruit having a suture about the circumference thereof comprising: an endless, vertically-positioned conveyor having a fruit loading station at one point near the base thereof and a fruit discharging station at the opposite side near the base thereof; means mounted upon and carried by the said endless conveyor for loosely supporting said fruit while exposing the bottom-most portion thereof, each of said fruit-supporting means being provided with a vertically-projecting rotatable wheel, said wheel being arranged and proportioned to contact the bottom of said fruit when said fruit rests upon said supporting means, said wheel being supported by a shaft rotatably mounted upon said fruit-supporting means; a stationary, endless link chain positioned along the conveyor path, said shaft having a sprocket on one end thereof for engagement with the links of the said stationary chain whereby to provide means for rotating the said shaft; an elongated retractable shield for the said wheel having the uppermost edge thereof proportioned for registry with the suture of said fruit, said shield being so positioned that when extended said shield contacts said fruit and prevents contact of the said fruit with said wheel; a shield-extending means operatively associated with the said shield, the said means including a bell crank pivoted to said fruit-supporting means, secured to the said shield and having a cam follower on one end thereof; a cam positioned along the said conveyor path at a point preceding the fruit discharging station, the said cam being positioned and proportioned for registry with the said cam follower of the said bell crank; and means for oscillating said shield about its vertical axis whereby to cause said registry of the said uppermost surface of said shield with said suture, said means comprising a cam follower operatively associated with the said shield and a cam secured along the said conveyor path at a point preceding the fruit discharging station, the said cam having an undulating track therein, said cam being positioned and proportioned for receipt of the said cam follower operatively associated with the said shield.

7. Means for orienting indented fruit having a suture about the circumference thereof comprising: an endless, vertically-positioned conveyor having a fruit loading station at one point near the base thereof and a fruit discharging station on the opposite side near the base thereof; means mounted upon and carried by the said endless conveyor for loosely supporting said fruit while continuously exposing the bottom-most portion thereof; cooperating means carried by the said fruit-supporting means and positioned along said conveyor path for maintaining the said fruit-supporting means in an upright position throughout the entire passage thereof from the said fruit loading station to the said fruit discharging station, each of said fruit-supporting means being provided with a vertically-projecting rotatable wheel, said wheel being arranged and proportioned to contact the bottom of said fruit when the said fruit rests upon said supporting means; a retractable shield for each of said wheels, said shield having the uppermost edge thereof proportioned for registry with the said suture of the said fruit, said shield being so positioned that when extended said uppermost edge of said shield contacts said fruit and prevents contact of said fruit with said wheel; means positioned at a point immediately following the fruit loading station for rotating the said wheel; means positioned along said conveyor path at a point preceding the fruit discharging station for extending said shield whereby to cause said registry of the uppermost edge of said shield with the said suture; and means for oscillating said shield about its vertical axis, said shield-oscillating means being positioned along the said conveyor path at a point preceding said fruit-discharging station.

8. Means for orienting indented fruit having a suture about the circumference thereof comprising: an endless, vertically-positioned conveyor having a fruit loading station and a fruit discharging station and having spaced therealong a plurality of means for loosely supporting said fruit while exposing the bottom-most portion thereof, said fruit-supporting means being mounted for rotation on the said endless conveyor; a bell crank fixedly secured to said fruit-supporting means at the axis of rotation thereof, said bell crank having a cam follower mounted at the end of each arm of said crank; a cam track fixed along the vertical path of said endless conveyor for engagement of one of said followers; a second cam track spaced from the path of the said first cam track at either end of said endless conveyor path for engagement of the other of said cam followers, the said cam tracks and the said bell crank being so oriented relative to one another that means are provided for maintaining the said fruit-supporting means in an upright position at all times, each of said fruit-supporting means being provided with a vertically-projecting rotatable wheel, said wheel being arranged and proportioned to contact the bottom of said fruit when the said fruit rests upon said supporting means; a retractable shield for each of said wheels, said shield having the uppermost edge thereof proportioned for registry with the said suture of the said fruit, said shield being so positioned that when extended said uppermost edge of said shield contacts said fruit and prevents contact of said fruit with said wheel; means positioned at a point immediately following the fruit loading station for rotating the said wheel; means positioned along said conveyor path at a point preceding the fruit discharging station for extending said shield whereby to cause said registry of the uppermost edge of said shield with the said suture; and means for oscillating said shield about its vertical axis, said shield oscillating means being positioned along the said conveyor path at a point preceding said fruit discharging station.

9. Means for orienting indented fruit having a suture about the circumference thereof and for transferring oriented fruit to a halver and pitter comprising: an endless conveyor having a fruit loading station and a fruit discharging station and having spaced therealong a plurality of means for loosely supporting said fruit while exposing the bottom-most portion thereof, each of said fruit-supporting means being provided with a vertically-projecting rotatable wheel, said wheel being arranged and proportioned to contact the bottom of said fruit when said fruit rests upon said supporting means; a retractable shield for each of said wheels, said shield having the uppermost edge thereof proportioned for registry with the suture of said fruit, said shield being so positioned that when extended, the uppermost edge of said shield contacts said fruit and prevents contact of said fruit with said wheel; means positioned at a point immediately following the fruit loading station for rotating said wheel; means positioned along said conveyor path at a point preceding the fruit discharging station for extending said shield whereby to cause said registry of the uppermost edge of the said shield with the said suture; means for oscillating said shield about its vertical axis, said shield-oscillating means being positioned along the conveyor path at a point preceding said fruit discharging station; and means positioned at said discharging station for grasping fruit carried by the said fruit-supporting means and transferring the said fruit to a halver and pitter, said means comprising a rotatable shaft having radially mounted thereabout a plurality of arms having gripper members at the extremities thereof, said arms and gripper members being arranged in cooperating pairs, the said means being synchronized to the movement of the said endless conveyor whereby pairs of cooperating gripper members surround and close upon oriented fruit as the said fruit reaches the said discharge station.

10. An endless conveyor having a fruit loading station and a fruit discharging station and having spaced therealong a plurality of concave supporting members, each of said concave supporting members having a hole at the centermost portion thereof whereby fruit having a stem indent may be supported by the said members and the bottom-most portion of said fruit exposed; a vertically positioned rotatable wheel extending from beneath each of the said supporting members through the said hole thereof, said wheel being arranged and proportioned to fit in the said stem indent of said fruit without continuously touching said fruit when said fruit rests upon said supporting means with the said stem indent downward and to contact the surface of said fruit when the said stem indent is oriented otherwise than to place the said stem indent directly over the said wheel; a retractable shield for each of the said wheels, said shield having the uppermost edge thereof proportioned for registry with the suture of said fruit, said shield being so positioned that when extended, said uppermost edge of said shield contacts said fruit and prevents contact of said fruit with said wheel; means positioned at a point immediately following the fruit loading station for rotating the said wheels; means positioned along said conveyor path at a point preceding said fruit discharging station for extending said shield whereby to cause said registry of the uppermost edge of the said shield with the said suture; and means for oscillating said shield about its vertical axis, said shield-oscillating means being positioned along the said conveyor path at a point preceding said fruit discharging station.

11. An endless conveyor arranged vertically having a fruit loading station at the base of one side thereof and a fruit discharging station at the base of the other side thereof, said conveyor having means thereon for orienting indented fruit having a suture about the circumference thereof, said orienting means comprising means carried by said conveyor for loosely supporting said fruit while exposing the bottom-most portion thereof, each of said fruit-supporting means being provided with a vertically-disposed rotatable wheel, said wheel being arranged and proportioned to contact the bottom of said fruit when said fruit rests upon said supporting means, said wheel being supported by a shaft rotatably mounted on the said fruit-supporting means; a stationary element positioned along said conveyor path; means mounted on the said shaft for contacting said stationary element whereby to rotate said shaft and the said wheel; a retractable shield for said wheel having the uppermost edge thereof proportioned for registry with the suture of said fruit, said shield being so positioned that when raised, the shield contacts said fruit and prevents contact of said fruit with the said wheel; means operatively associated with the said shield and secured to the said fruit-supporting means for raising said shield when the said means is actuated; means positioned along said conveyor path at a point preceding said fruit discharging station for actuating said shield-raising means; means for oscillating said shield about its vertical axis after the said shield has been raised; and means positioned along said conveyor path between the said means for actuating the said shield-raising means and the said fruit loading station for oscillating the said wheel.

12. An endless conveyor arranged vertically having a fruit loading station at the base of one side thereof and a fruit discharging station at the base of the other side thereof, said conveyor having means thereon for orienting indented fruit having a suture about the circumference thereof, said orienting means comprising means carried by said conveyor for loosely supporting said fruit while exposing the bottom-most portion thereof, each of said fruit-supporting means being provided with a vertically-disposed rotatable wheel, said wheel being arranged and proportioned to contact the bottom of said fruit when said fruit rests upon said supporting means, said wheel being supported by a shaft rotatably mounted on said fruit-supporting means; a stationary element positioned along the entire length of said conveyor path; means on the said shaft for contacting said stationary element whereby to rotate the said shaft and the said wheel as said supporting means is moved along said conveyor path; a retractable shield for said wheel having the uppermost edge thereof proportioned for registry with the suture of said fruit, said shield being so positioned that when raised, the shield contacts said fruit and prevents contact of said fruit with the said wheel; means operatively associated with the said shield and secured to the said fruit-supporting means for raising said shield when the said means is actuated; means positioned along said conveyor path at a point preceding said fruit discharging station for actuating said shield-raising means; means for oscillating said shield about its vertical axis after the said shield has been raised; and means positioned along said conveyor path between the said means for actuating the said shield-raising means and the said fruit loading station for oscillating the said wheel.

13. Means for orienting indented fruit having a suture about the circumference thereof comprising: an endless conveyor having a fruit loading station and a fruit discharging station and having spaced therealong a plurality of means for loosely supporting said fruit while exposing the bottom-most portion thereof, each of said means being mounted for rotation relative to said endless conveyor, each of said fruit supporting means carrying a rotatable wheel positioned vertically, each of said wheels being arranged and proportioned to contact the bottom of said fruit when said fruit rests upon said supporting means; a retractable shield for each of said wheels, each of said shields having the uppermost edge thereof proportioned for registry with the suture of said fruit, said shield being so proportioned that when extended, said uppermost edge of said shield contacts said fruit and prevents contact of said fruit with said wheel; means positioned at a point immediately following said fruit loading station for rotating each of the said wheels; means positioned along said conveyor path at a point preceding said fruit-discharging station for extending each of said shields whereby to cause registry of the uppermost edge of the shield with the said suture; means for oscillating the said shield about its vertical axis, said shield-oscillating means being positioned along the said conveyor path at a point preceding said fruit discharging station; cooperating means carried by each of the said fruit-supporting means and mounted upon said conveyor at either end thereof, each of said last-mentioned means cooperating to maintain the said fruit-supporting means in an upright position at all times.

14. Means for orienting indented fruit having a suture about the circumference thereof comprising: an endless conveyor having a fruit loading station and a fruit discharging station and having spaced therealong a plurality of means for loosely supporting said fruit while exposing the bottom-most portion thereof, each of said means being mounted for rotation relative to said endless conveyor, each of said fruit-supporting means carrying a rotatable wheel positioned vertically, each of said wheels being arranged and proportioned to contact the bottom of said fruit when said fruit rests upon said supporting means; a retractable shield for each of said wheels, each of said shields having the uppermost edge thereof proportioned for registry with the suture of said fruit, said shield being so proportioned that when extended, said uppermost edge of said shield contacts said fruit and prevents contact of said fruit with said wheel; means positioned at a point immediately following said fruit loading station for rotating each of the said wheels; means positioned along said conveyor path at a point preceding said fruit discharging station for extending each of said shields whereby to cause registry of the uppermost edge of the shield with the said suture; means for oscillating the said shield about its vertical axis, said shield-oscillating means being positioned along the said conveyor path at a point preceding said fruit discharging station; cooperating means carried by each of the said fruit-supporting means and mounted upon said conveyor at either end thereof, said means mounted on said supporting means comprising a bell crank fixedly secured to said supporting means at the axis of rotation thereof, said bell crank having a cam follower mounted on each arm of the said crank, said means mounted along the said conveyor path comprising a cam track fixed along the vertical path of the said endless conveyor for engagement of one of the said followers and a second cam track spaced from the path of the said first cam track at either end of the said endless conveyor path for engagement of the other of said cam followers whereby to provide means for maintaining the said supporting means in an upright position at all times.

15. Means for orienting indented fruit having a suture about the circumference thereof comprising: an endless vertical conveyor having a loading station at the base of one side thereof and a discharging station at the base of the other side thereof; means for loosely supporting said fruit while exposing the bottom-most portion thereof, said supporting means being secured to said endless conveyor and being mounted for rotation relative to said endless conveyor; a rotatable means for turning said fruit about its horizontal axis, said means being arranged and proportioned to contact the bottom of said fruit when said fruit rests upon said supporting means; non-rotating means so positioned as to be capable of contacting the bottom-most portion of said fruit, said non-rotating means having an uppermost edge so proportioned as to be capable of registry with the suture of said fruit; means for oscillating said non-rotating means about its vertical axis whereby to cause registry of the said uppermost edge of said non-rotating means with the said suture; a bell crank fixedly secured to said supporting means at the axis of rotation thereof, said bell crank having a cam follower mounted on each arm of the said crank; a cam track fixed along the vertical path of the said endless conveyor for engagement of one of said followers; and a second cam track spaced from the path of the said first cam track at either end of the said endless conveyor path for engagement of the other of the said cam followers whereby to provide means for maintaining the said supporting means in an upright position at all times.

16. Means for orienting indented fruit having a suture about the circumference thereof comprising means for loosely supporting said fruit while exposing the bottom-most portion thereof, a vertically positioned wheel, means supporting said wheel for rotation in contact with the bottom of fruit on such support means, and means for rotating the wheel at a substantially constant speed including a rotatable ring gear, and means for oscillating the ring gear to alter the speed of rotation of the wheel.

References Cited in the file of this patent

UNITED STATES PATENTS

| | | |
|---|---|---|
| 1,931,141 | Caesar | Oct. 17, 1933 |
| 2,568,947 | Carroll | Sept. 25, 1951 |
| 2,572,773 | Slagle | Oct. 23, 1951 |
| 2,626,700 | Schonwald | Jan. 27, 1953 |
| 2,724,485 | Reading | Nov. 22, 1955 |
| 2,859,856 | Fox | Nov. 11, 1958 |
| 2,923,396 | Hait | Feb. 2, 1960 |
| 3,003,610 | Boyce | Oct. 10, 1961 |
| 3,016,076 | Keesling | Jan. 9, 1962 |
| 3,040,864 | Belk | June 26, 1962 |

FOREIGN PATENTS

| | | |
|---|---|---|
| 572,008 | Germany | Jan. 21, 1928 |